(12) United States Patent
Chuang

(10) Patent No.: US 12,210,705 B1
(45) Date of Patent: Jan. 28, 2025

(54) TOUCH DEVICE AND OPERATION METHOD FOR TOUCH DEVICE

(71) Applicant: Nuvoton Technology Corporation, Hsinchu (TW)

(72) Inventor: Fu-Chiang Chuang, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days.

(21) Appl. No.: 18/638,687

(22) Filed: Apr. 18, 2024

(30) Foreign Application Priority Data

Jul. 26, 2023 (TW) .................................. 112127907

(51) Int. Cl.
  *G06F 3/041* (2006.01)
  *G06F 3/044* (2006.01)
(52) U.S. Cl.
  CPC ............ *G06F 3/0418* (2013.01); *G06F 3/044* (2013.01); *G06F 2203/04104* (2013.01)
(58) Field of Classification Search
  CPC .................. G06F 3/0418; G06F 3/044; G06F 2203/04104
  See application file for complete search history.

(56) References Cited

U.S. PATENT DOCUMENTS

2019/0369775 A1  12/2019  Lee et al.

FOREIGN PATENT DOCUMENTS

| CN | 111610872 | 9/2020 |
| CN | 112379790 | 2/2021 |
| CN | 112835474 | 5/2021 |
| CN | 114461094 | 5/2022 |
| TW | 201642101 | 12/2016 |
| TW | 1706304 | 10/2020 |

*Primary Examiner* — Michael Pervan
(74) *Attorney, Agent, or Firm* — JCIPRNET

(57) ABSTRACT

A touch device and an operation method for the touch device are provided. The touch device includes touch keys, controllers, and a processing circuit. The controllers group selected touch keys among the touch keys into at least one touch key group. Each of the at least one touch key group includes at least two selected touch keys. When the selected touch keys of a first touch key group among the at least one touch key group are simultaneously touched, the processing circuit sequentially provides touch driving signals to the first touch key group and receives touch sensing signal groups corresponding to the touch driving signals. When the touch sensing signal groups all indicate that the selected touch keys of the first touch key group are simultaneously touched, the processing circuit determines that the touch on the first touch key group is a valid touch.

20 Claims, 3 Drawing Sheets

TOUCH DEVICE AND OPERATION METHOD FOR TOUCH DEVICE

CROSS-REFERENCE TO RELATED APPLICATION

This application claims the priority benefit of Taiwan application serial no. 112127907, filed on Jul. 26, 2023. The entirety of the above-mentioned patent application is hereby incorporated by reference herein and made a part of this specification.

BACKGROUND

Technical Field

The disclosure relates to a touch device and an operation method for the touch device, and in particular, to a touch device capable of being equipped with an anti-interference function and an operation method thereof.

Description of Related Art

At present, touch devices (e.g., equipment, home appliances, or electronic devices) include a plurality of touch keys. A user can control a touch device to perform functions corresponding to the user's touch behavior through the plurality of touch keys. In order to increase the diversity of functions, the multi-finger touch operation is introduced into touch devices. The multi-finger touch operation means that, for example, the user can simultaneously operate (such as touch or press) the first touch key and the second touch key among the plurality of touch keys, so that the touch device performs a function corresponding to the multi-finger touch operation. In addition, the user may also operate the first touch key only to control the touch device to perform the single-finger touch operation.

However, when one of the touch keys involved in the multi-finger touch operation is operated by the user, other touch keys involved in the multi-finger touch operation may be interfered. For instance, when the first touch key involved in the multi-finger touch operation is operated by the user (i.e., the single-finger touch operation), the second touch key may be interfered, and the touch device may misjudge that the interfered second touch key is being touched or pressed by the user. As a result, the touch device may perform a function corresponding to the multi-finger touch operation. The above situation will become more serious in a high noise environment.

It thus can be seen that how to enable a touch device to be equipped with an anti-interference function to correctly determine whether a multi-finger touch operation occurs is an important issue for a person having ordinary skill in the art.

SUMMARY

The disclosure provides a touch device capable of being equipped with an anti-interference function and an operation method.

The disclosure provides a touch device including a plurality of touch keys, a plurality of controllers, and a processing circuit. The plurality of controllers group a plurality of selected touch keys among the plurality of touch keys into at least one touch key group. Each of the at least one touch key group includes at least two selected touch keys. The processing circuit is coupled to the plurality of touch keys. The processing circuit receives a plurality of first touch sensing signal groups from the at least one touch key group and determines a touch on the at least one touch key group according to the plurality of first touch sensing signal groups. When the plurality of selected touch keys of a first touch key group among the at least one touch key group are simultaneously touched, the processing circuit sequentially provides a plurality of touch driving signals to the first touch key group and receives a plurality of second touch sensing signal groups corresponding to the plurality of touch driving signals. Frequencies of the plurality of touch driving signals are different from one another. When the plurality of second touch sensing signal groups all indicate that the plurality of selected touch keys of the first touch key group are simultaneously touched, the processing circuit determines that the touch on the first touch key group is a valid touch.

The disclosure further provides an operation method for a touch device. The touch device includes a plurality of touch keys and a plurality of controllers. The operation method includes the following steps. The plurality of controllers group a plurality of selected touch keys among the plurality of touch keys into at least one touch key group. Each of the at least one touch key group includes at least two selected touch keys. A plurality of first touch sensing signal groups from the at least one touch key group are received, and a touch on the at least one touch key group is determined according to the plurality of first touch sensing signal groups. When the plurality of selected touch keys of a first touch key group among the at least one touch key group are simultaneously touched, a plurality of touch driving signals are sequentially provided to the first touch key group, and a plurality of second touch sensing signal groups corresponding to the plurality of touch driving signals are received. Frequencies of the plurality of touch driving signals are different from one another. When the plurality of second touch sensing signal groups all indicate that the plurality of selected touch keys of the first touch key group are simultaneously touched, the touch on the first touch key group is determined to be a valid touch.

To sum up, when the plurality of selected touch keys of the first touch key group are simultaneously touched, the plurality of touch driving signals having different frequencies are sequentially provided to the first touch key group, and the plurality of second touch sensing signal groups corresponding to the plurality of touch driving signals are received. When the plurality of second touch sensing signal groups all indicate that the plurality of selected touch keys of the first touch key group are simultaneously touched, the touch on the first touch key group is determined to be a valid touch. In this way, the touch device and the operation method can be equipped with an anti-interference function, so that the touch device can correctly determine whether a multi-finger touch operation occurs.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
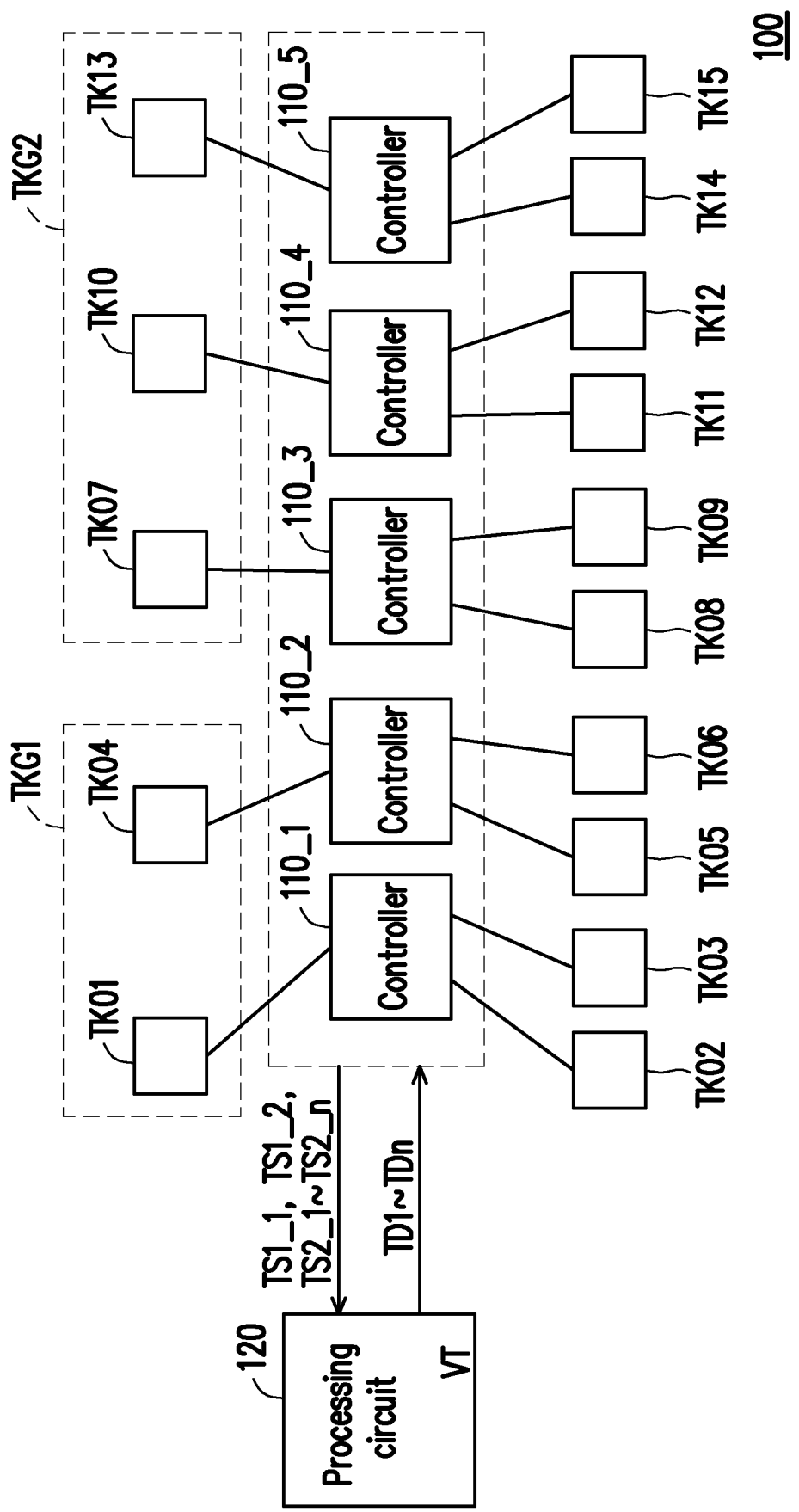
FIG. 1 is a schematic diagram of a touch device according to an embodiment of the disclosure.

Several embodiments of the disclosure are described in detail below accompanying with figures. In terms of the reference numerals used in the following descriptions, the same reference numerals in different figures should be considered as the same or the like elements. The embodiments are only a portion of the disclosure, which do not present all embodiments of the disclosure. More specifically, these embodiments are only examples in the scope of the patent application of the disclosure.

Figure 2:
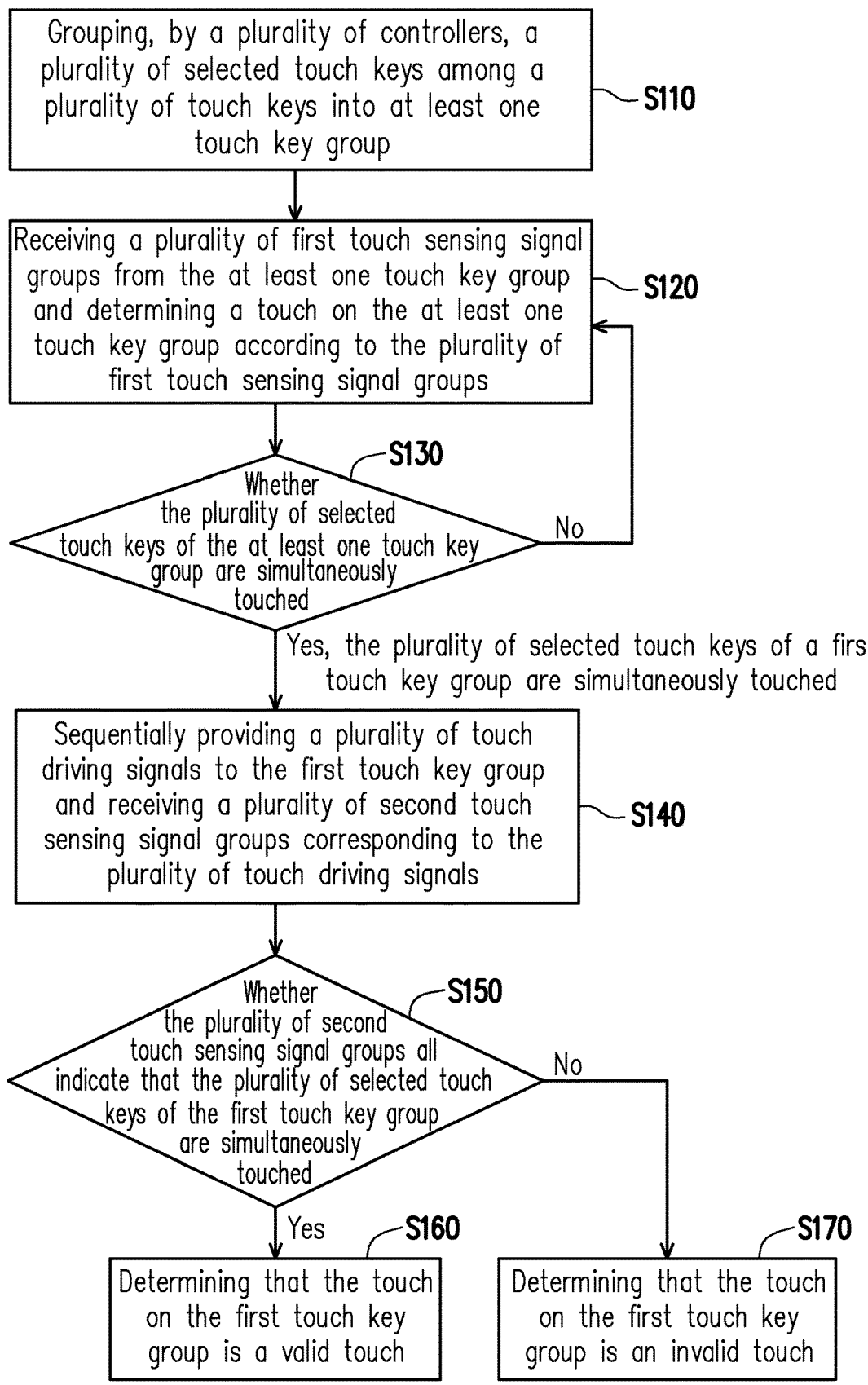
FIG. 2 is a flow chart of an operation method according to an embodiment of the disclosure.

With reference to FIG. 1 and FIG. 2 together, FIG. 1 is a schematic diagram of a touch device according to an embodiment of the disclosure, and FIG. 2 is a flow chart of an operation method according to an embodiment of the disclosure. In this embodiment, a touch device 100 is, for example, a device, a household appliance, or an electronic device (the disclosure is not limited thereto) equipped with a touch function. An operation method S100 is suitable for operating the touch device 100. In this embodiment, the touch device 100 includes touch keys TK01 to TK15, controllers 110_1 to 110_5, and a processing circuit 120. The touch keys TK01 to TK15 may be capacitive touch keys in any form (the disclosure is not limited thereto). The touch keys TK01 to TK15 are, for example, mutual-capacitance type touch keys or self-capacitance type touch keys. The controllers 110_1 to 110_5 are, for example, channel selection circuits. The processing circuit 120 is coupled to the controllers 110_1 to 110_5. The processing circuit 120 may be, for example, a central processing unit (CPU), a programmable microprocessor for general or special use, a digital signal processor (DSP), a programmable controller, an application specific integrated circuit (ASIC), a programmable logic device (PLD), or any other similar devices or a combination of the foregoing devices, and may be loaded to run a computer program.

In this embodiment, the operation method S100 includes steps S110 to S170. In step S110, the controllers 110_1 to 110_5 group a plurality of selected touch keys among the touch keys TK01 to TK15 into touch key groups TKG1 and TKG2. Each of the touch key groups TKG1 and TKG2 includes at least two selected touch keys.

For instance, the controller 110_1 is coupled to the touch keys TK01 to TK03 (or referred to as first touch keys TK01 to TK03). The controller 110_2 is coupled to the touch keys TK04 to TK06 (or referred to as second touch keys TK04 to TK06). The controller 110_3 is coupled to the touch keys TK07 to TK09 (or referred to as third touch keys TK07 to TK09). The controller 110_4 is coupled to the touch keys TK10 to TK12 (or referred to as fourth touch keys TK10 to TK12). The controller 110_5 is coupled to the touch keys TK13 to TK15 (or referred to as fifth touch keys TK13 to TK15). The controller 110_1 selects one of the touch keys TK01 to TK03 as a first selected touch key. The controller 110_2 selects one of the touch keys TK04 to TK06 as a second selected touch key. For instance, the controller 110_1 selects the touch key TK01 as the first selected touch key. For instance, the controller 110_2 selects the touch key TK04 as the second selected touch key. The touch keys TK01 and TK04 are grouped into the touch key group TKG1. The controller 110_3 selects one of the touch keys TK07 to TK09 as a third selected touch key. The controller 110_4 selects one of the touch keys TK10 to TK12 as a fourth selected touch key. The controller 110_5 selects one of the touch keys TK13 to TK15 as a fifth selected touch key. For instance, the controller 110_3 selects the touch key TK07 as the third selected touch key. For instance, the controller 110_4 selects the touch key TK10 as the fourth selected touch key. For instance, the controller 110_5 selects the touch key TK13 as the fifth selected touch key. The touch keys TK07, TK10, and TK13 are grouped into the touch key group TKG2.

In step S120, the processing circuit 120 receives first touch sensing signal groups TS1_1 from the touch key group TKG1 and first touch sensing signal groups TS1_2 from the touch key group TKG2. In this embodiment, the plurality of first touch sensing signal groups TS1_1 are touch sensing signals from at least two selected touch keys of the touch key group TKG1. The plurality of first touch sensing signal groups TS1_2 are touch sensing signals from at least two selected touch keys of the touch key group TKG2.

In step S130, the processing circuit 120 determines a touch on the touch key groups TKG1 and TKG2 according to the first touch sensing signal groups TS1_1 and TS1_2. In this embodiment, taking the touch key group TKG1 as the "first touch key group" as an example, when the touch keys TK01 and TK04 (i.e., the selected touch keys of the touch key group TKG1) of the touch key group TKG1 are simultaneously touched, it means that the plurality of selected touch keys of the touch key group TKG1 may be subjected to a multi-finger touch. Therefore, in step S140, the processing circuit 120 sequentially provides touch driving signals TD1 to TDn to the touch key group TKG1 and receives second touch sensing signal groups TS2_1 to TS2_$n$ corresponding to the touch driving signals TD1 to TDn. In this embodiment, the second touch sensing signal group TS2_1 corresponds to the driving signal TD1. The second touch sensing signal group TS2_2 corresponds to the driving signal TD2. It can thus be deduced that the second touch sensing signal group TS2_$n$ corresponds to the driving signal TDn. In this embodiment, frequencies of the driving signals TD1 to TDn are different from one another. Therefore, the touch keys TK01 and TK04 of the touch key group TKG1 respond to the driving signal TD1 having a first frequency to provide a plurality of touch sensing signals of the second touch sensing signal group TS2_1. The touch keys TK01 and TK04 of the touch key group TKG1 respond to the driving signal TD1 having a second frequency to provide a plurality of touch sensing signals of the second touch sensing signal group TS2_2, and the rest may be deduced by analogy.

On the other hand, in step S130, when the touch keys TK01 and TK04 of the touch key group TKG1 are not simultaneously touched, the processing circuit 120 returns to the operation of step S120.

In step S150, the processing circuit 120 determines the second touch sensing signal group TS2_1 to TS2_$n$. When the second touch sensing signal groups TS2_1 to TS2_$n$ all indicate that the touch keys TK01 and TK04 of the touch key group TKG1 are simultaneously touched, this means that the touch keys TK01 and TK04 are determined to be "being simultaneously touched" at different frequencies. Therefore, the processing circuit 120 determines in step S160 that the touch on the touch key group TKG1 is a valid touch (i.e., a valid multi-finger touch). In addition, when the second touch sensing signal groups TS2_1 to TS2_$n$ all indicate that the touch keys TK01 and TK04 of the touch key group TKG1 are simultaneously touched, the processing circuit 120 executes an operation corresponding to the valid touch on the touch key group TKG1.

On the other hand, when at least one of the second touch sensing signal groups TS2_1 to TS2_*n* indicates that the touch keys TK01 and TK04 of the touch key group TKG1 are not simultaneously operated, this means that the touch keys TK01 and TK04 are interfered by a specific frequency, resulting in an erroneous determination of "being simultaneously touched". Therefore, the processing circuit 120 determines in step S170 that the touch on the touch key group TKG1 is an invalid touch (i.e., an invalid multi-finger touch). For instance, when the second touch sensing signal group TS2_1 indicates that the touch keys TK01 and TK04 of the touch key group TKG1 are simultaneously operated and the second touch sensing signal group TS2_2 indicates that the touch keys TK01 and TK04 of the touch key group TKG1 are simultaneously operated, the processing circuit 120 determines that the touch keys TK01 and TK04 are interfered by noise. The frequency of the noise is similar to the first frequency of the driving signal TD1. Therefore, the processing circuit 120 is able to analyze an interference source.

In this embodiment, after step S160 or step S170, the processing circuit 120 returns to the operation of step S120. In some embodiments, after step S160 or step S170, the controllers 110_1 to 110_5 may regroup the plurality of selected touch keys among the touch keys TK01 to TK15 into the touch key groups TKG1 and TKG2 in the step S110.

It should be noted that when the plurality of selected touch keys of the touch key group TKG1 are simultaneously touched, the processing circuit 120 sequentially provides the driving signals TD1 to TDn having different frequencies to the touch key group TKG1 and receives the second touch sensing signal groups TS2_1 to TS2_*n* corresponding to the driving signals TD1 to TDn. Only when the second touch sensing signal groups TS2_1 to TS2_*n* all indicate that the touch keys TK01 and TK04 of the touch key group TKG1 are simultaneously touched will the processing circuit 120 determine that the touch on the touch key group TKG1 is a valid touch. In this way, the touch device 100 and the operation method S100 can be equipped with an anti-interference function, so that the touch device can correctly determine whether a multi-finger touch operation occurs.

It should also be noted that each of the controllers 110_1 to 110_5 selects one single touch key as the selected touch key. In this way, interference among the selected touch keys may be isolated from one another.

In this embodiment, the processing circuit 120 receives the first touch sensing signal groups TS1_1 from the touch key group TKG1 and the first touch sensing signal groups TS1_2 from the touch key group TKG2 in step S120 through the controllers 110_1 to 110_5. The processing circuit 120 provides the touch driving signals TD1 to TDn to the touch key group TKG1 through the controllers 110_1 to 110_5 and receives the second touch sensing signal groups TS2_1 to TS2_*n* from the touch key group TKG1 through the controllers 110_1 to 110_5 in step S140.

In some embodiment, the processing circuit 120 directly receives the first touch sensing signal groups TS1_1 from the touch key group TKG1 and the first touch sensing signal groups TS1_2 from the touch key group TKG2 in step S120. The processing circuit 120 directly provides the touch driving signals TD1 to TDn to the touch key group TKG1 and directly receives the second touch sensing signal groups TS2_1 to TS2_*n* from the touch key group TKG1 in step S140.

The determination of a touch and operation on the touch key group TKG2 by the processing circuit 120 can be easily deduced from steps S130 to S170.

In this embodiment, 5 controllers 110_1 to 110_5, 2 touch key groups TKG1 and TKG2, and 15 touch keys TK01 to TK15 are used as an example. However, the disclosure is not limited to this embodiment, and the number of controllers of the disclosure may be multiple. The number of touch keys is greater than or equal to the number of controllers in the disclosure. The number of touch key groups of in the disclosure may be one or more.

In some embodiments, the processing circuit 120 sets the channel selection for the controllers 110_1 to 110_5, so as to control the controllers 110_1 to 110_5 to select a plurality of selected touch keys and control the controllers 110_1 to 110_5 to collectively group the plurality of selected touch keys into at least one touch key group.

The implementation details of steps S130 to S170 are to be illustrated below with examples.

In this embodiment, the first touch sensing signal groups TS1_1 from the touch keys TK01 and TK04 (i.e., the selected touch keys of the touch key group TKG1) of the touch key group TKG1 have a plurality of touch intensities. The plurality of touch intensities correspond to the touch keys TK01 and TK04 of the touch key group TKG1. In step S130, the processing circuit 120 determines the plurality of touch intensities of the first touch sensing signal groups TS1_1. When the plurality of touch intensities are greater than a threshold value VT, the processing circuit 120 may sequentially provide the touch driving signals TD1 to TDn to the touch key group TKG1 in step S140. On the other hand, when at least one of the plurality of touch intensities is less than or equal to the threshold value VT, the processing circuit 120 stops providing the touch driving signals TD1 to TDn to the touch key group TKG1.

Figure 3:
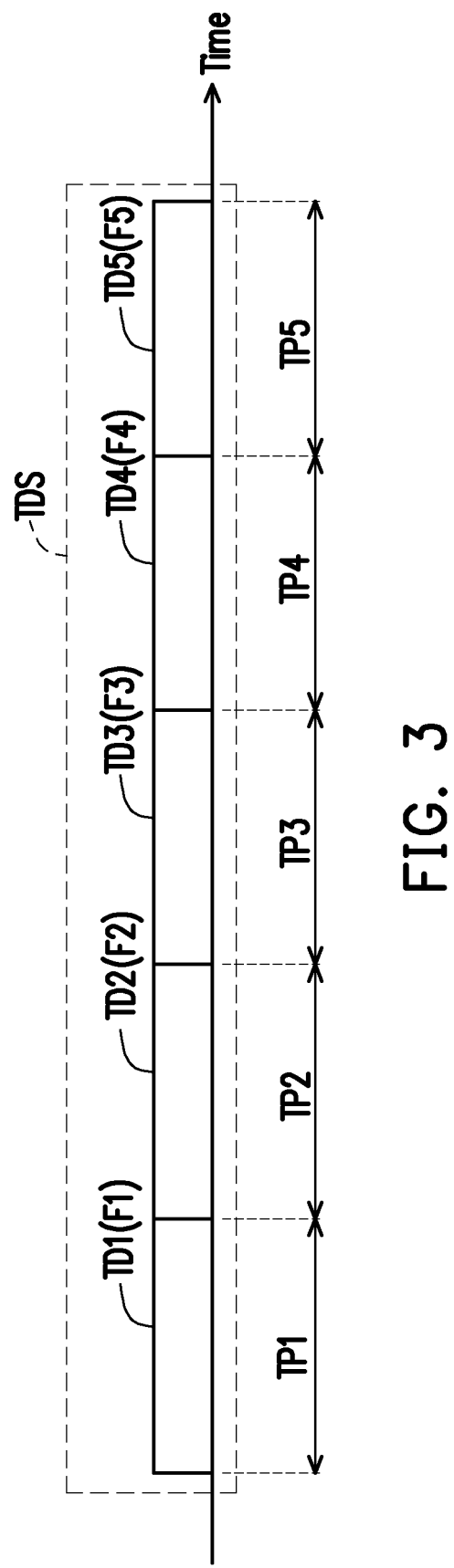
FIG. 3 is a sequence diagram of a touch driving signal illustrated according to step S140.

With reference to FIG. 1, FIG. 2, and FIG. 3 together, FIG. 3 is a sequence diagram of a touch driving signal according to an embodiment of the disclosure. In this embodiment, FIG. 3 is a sequence diagram of a touch driving signal illustrated according to step S140. In this embodiment, the processing circuit 120 sequentially provides the touch driving signals TD1 to TD5 to the touch key group TKG1. Therefore, the touch driving signals TD1 to TD5 form a touch driving signal series TDS. The processing circuit 120 provides the touch driving signal TD1 first and then provides the touch driving signal TD2, and so on.

In this embodiment, the touch driving signal TD1 has a frequency F1. The touch driving signal TD2 has a frequency F2. The touch driving signal TD3 has a frequency F3. The touch driving signal TD4 has a frequency F4. The touch driving signal TD5 has a frequency F5. The frequencies F1 to F5 are different from one another. For instance, the frequency F1 is 125 kHz. The frequency F2 is 250 kHz. The frequency F3 is 500 kHz. The frequency F4 is 1 MHz. The frequency F5 is 2 MHz. The number, sequence, and frequencies of the touch driving signals are not limited in the disclosure.

In addition, the touch driving signal TD1 has a time length TP1. The touch driving signal TD2 has a time length TP2. The touch driving signal TD3 has a time length TP3. The touch driving signal TD4 has a time length TP4. The touch driving signal TD5 has a time length TP5. In this embodiment, the time lengths TP1 to TP5 may be the same or different. The time lengths TP1 to TP5 may be set according to actual needs in use. The setting of the time lengths TP1 to TP5 is related to the supply times of pulse waves of the touch driving signals TD1 to TD5.

In step S140, the processing circuit 120 may provide the touch driving signal series TDS to the touch key group TKG1 one or more times. Therefore, the processing circuit 120 may receive the second touch sensing signal groups TS2_1 to TS2_5 (i.e., n is equal to 5). The second touch sensing signal group TS2_1 includes the plurality of touch intensities generated by the selected touch keys of the touch key group TKG1 in response to the touch driving signal TD1. The second touch sensing signal group TS2_2 includes the plurality of touch intensities generated by the selected touch keys of the touch key group TKG1 in response to the touch driving signal TD2, and the rest may be deduced by analogy. For instance, when the touch intensities from the touch key TK01 are all greater than the threshold value VT, it indicates that the touch key TK01 may be subjected to a touch action. When the touch intensities from the touch key TK01 are all less than or equal to the threshold value VT, it indicates that the touch key TK01 may not be subjected to a touch action.

In step S150, when all the touch intensities of the second touch sensing signal groups TS2_1 to TS2_5 are greater than the threshold value VT, the processing circuit 120 determines that the touch on the touch key group TKG1 is a valid touch in step S160.

On the other hand, when at least one touch intensity of the second touch sensing signal groups TS2_1 to TS2_5 is less than or equal to the threshold value VT, the processing circuit 120 determines that the touch on the touch key group TKG1 is an invalid touch in step S170.

Further, when the at least one touch intensity of the second touch sensing signal groups TS2_1 to TS2_5 is less than or equal to the threshold value, the processing circuit 120 may use the second touch sensing signal groups TS2_1 to TS2_5 to analyze the interference source of the environment where the touch device 100 is located and determine the frequency of the interference source in step S170. For instance, when the touch intensities of the second touch sensing signal group TS2_1 are all greater than the threshold value VT and at least one touch intensity of each of the second touch sensing signal groups TS2_2 to TS2_5 is less than or equal to the threshold value, the processing circuit 120 may determine that the touch key group TKG1 is interfered by the noise with the frequency F1 and then learns that the interference source is the noise with the frequency F1. For another instance, when the touch intensities of the second touch sensing signal groups TS2_1 and TS2_2 are all greater than the threshold value VT and at least one touch intensity of each of the second touch sensing signal groups TS2_3 to TS2_5 is less than or equal to the threshold value, the processing circuit 120 may determine that the touch key group TKG1 is interfered by multiple noises with frequencies F1 and F2 and then learns that the interference source is the noise with frequency F1 and the noise with frequency F2.

In view of the foregoing, when the plurality of selected touch keys of the touch key group are simultaneously touched, the processing circuit sequentially provides the plurality of driving signals having different frequencies to the touch key group and receives the plurality of second touch sensing signal groups corresponding to the plurality of driving signals. Only when the plurality of second touch sensing signal groups all indicate that the selected touch keys of the touch key group are simultaneously touched will the processing circuit determine that the touch on the touch key group is a valid touch. In this way, the touch device can be equipped with an anti-interference function in the disclosure, so that the touch device can correctly determine whether a multi-finger touch operation occurs. Each of the controllers of the touch device selects one single touch key as the selected touch key. In this way, interference among the selected touch keys may be isolated from one another. In addition, the processing circuit can also analyze the interference source according to the plurality of second touch sensing signal groups.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch device, comprising:
   a plurality of touch keys;
   a plurality of controllers configured to group a plurality of selected touch keys among the plurality of touch keys into at least one touch key group, wherein each of the at least one touch key group comprises at least two selected touch keys; and
   a processing circuit coupled to the plurality of controllers and configured to:
      receive a plurality of first touch sensing signal groups from the at least one touch key group and determine a touch on the at least one touch key group according to the plurality of first touch sensing signal groups,
      when the plurality of selected touch keys of a first touch key group among the at least one touch key group are simultaneously touched, sequentially provide a plurality of touch driving signals to the first touch key group and receive a plurality of second touch sensing signal groups corresponding to the plurality of touch driving signals, wherein frequencies of the plurality of touch driving signals are different from one another, and
      when the plurality of second touch sensing signal groups all indicate that the plurality of selected touch keys of the first touch key group are simultaneously touched, determine that the touch on the first touch key group is a valid touch.

2. The touch device according to claim 1, wherein when at least one among the plurality of second touch sensing signal groups indicates that the plurality of selected touch keys of the first touch key group are not simultaneously operated, the processing circuit determines that the touch on the first touch key group is an invalid touch.

3. The touch device according to claim 1, wherein when the plurality of second touch sensing signal groups all indicate that the plurality of selected touch keys of the first touch key group are simultaneously operated, the processing circuit executes an operation corresponding to the valid touch on the first touch key group.

4. The touch device according to claim 1, wherein
   the plurality of controllers comprise a first controller and a second controller,
   the first controller is coupled to a plurality of first touch keys among the plurality of touch keys,
   the first controller selects one of the plurality of first touch keys as a first selected touch key,
   the second controller is coupled to a plurality of second touch keys among the plurality of touch keys,
   the second controller selects one of the plurality of second touch keys as a second selected touch key, and
   the first selected touch key and the second selected touch key are grouped into the first touch key group.

5. The touch device according to claim 4, wherein
the plurality of controllers further comprise a third controller and a fourth controller,
the third controller is coupled to a plurality of third touch keys among the plurality of touch keys,
the third controller selects one of the plurality of third touch keys as a third selected touch key,
the fourth controller is coupled to a plurality of fourth touch keys among the plurality of touch keys,
the fourth controller selects one of the plurality of fourth touch keys as a fourth selected touch key, and
the third selected touch key and the fourth selected touch key are grouped into a second touch key group.

6. The touch device according to claim 1, wherein
the first touch sensing signal groups from the plurality of selected touch keys of the first touch key group have a plurality of touch intensities,
the plurality of touch intensities correspond to the plurality of selected touch keys of the first touch key group, and
when the plurality of touch intensities are greater than a threshold value, the processing circuit sequentially provides the plurality of touch driving signals to the first touch key group.

7. The touch device according to claim 6, wherein when at least one of the plurality of touch intensities is less than or equal to the threshold value, the processing circuit stops providing the plurality of touch driving signals to the first touch key group.

8. The touch device according to claim 1, wherein
the plurality of touch driving signals comprise a first touch driving signal having a first frequency and a second touch driving signal having a second frequency,
the plurality of second touch sensing signal groups comprise a plurality of first touch intensities and a plurality of second touch intensities generated by the plurality of selected touch keys of the first touch key group in response to the first touch driving signal and the second touch driving signal, respectively, and
when the plurality of first touch intensities and the plurality of second touch intensities are both greater than a threshold value, the processing circuit determines that the touch on the first touch key group is a valid touch.

9. The touch device according to claim 8, wherein when the plurality of first touch intensities and at least one touch intensity among the plurality of second touch intensities are less than or equal to the threshold value, the processing circuit determines that the touch on the first touch key group is an invalid touch.

10. The touch device according to claim 8, wherein when all of the plurality of first touch intensities are greater than the threshold value and at least one touch intensity among the plurality of second touch intensities is less than or equal to the threshold value, the processing circuit determines that the touch on the first touch key group is an invalid touch and determines that the first touch key group is interfered by noise having a first frequency.

11. An operation method for a touch device comprising a plurality of touch keys and a plurality of controllers, wherein the operation method comprises:
grouping, by the plurality of controllers, a plurality of selected touch keys among the plurality of touch keys into at least one touch key group, wherein each of the at least one touch key group comprises at least two selected touch keys;
receiving a plurality of first touch sensing signal groups from the at least one touch key group and determining a touch on the at least one touch key group according to the plurality of first touch sensing signal groups;
when the plurality of selected touch keys of a first touch key group among the at least one touch key group are simultaneously touched, sequentially providing a plurality of touch driving signals to the first touch key group and receiving a plurality of second touch sensing signal groups corresponding to the plurality of touch driving signals, wherein frequencies of the plurality of touch driving signals are different from one another, and
when the plurality of second touch sensing signal groups all indicate that the plurality of selected touch keys of the first touch key group are simultaneously touched, determining that the touch on the first touch key group is a valid touch.

12. The operation method according to claim 11, further comprising:
when at least one among the plurality of second touch sensing signal groups indicates that the plurality of selected touch keys of the first touch key group are not simultaneously operated, determining that the touch on the first touch key group is an invalid touch.

13. The operation method according to claim 11, further comprising:
when the plurality of second touch sensing signal groups all indicate that the plurality of selected touch keys of the first touch key group are simultaneously operated, executing an operation corresponding to the valid touch on the first touch key group.

14. The operation method according to claim 11, wherein the plurality of controllers comprise a first controller and a second controller, wherein the first controller is coupled to a plurality of first touch keys among the plurality of touch keys, wherein the second controller is coupled to a plurality of second touch keys among the plurality of touch keys, wherein the step of grouping, by the plurality of controllers, the plurality of selected touch keys among the plurality of touch keys into the at least one touch key group comprises:
selecting, by the first controller, one of the plurality of first touch keys as a first selected touch key;
selecting, by the second controller, one of the plurality of second touch keys as a second selected touch key; and
grouping the first selected touch key and the second selected touch key into the first touch key group.

15. The operation method according to claim 14, wherein the plurality of controllers further comprise a third controller and a fourth controller, wherein the third controller is coupled to a plurality of third touch keys among the plurality of touch keys, wherein the fourth controller is coupled to a plurality of fourth touch keys among the plurality of touch keys, wherein the step of grouping, by the plurality of controllers, the plurality of selected touch keys among the plurality of touch keys into the at least one touch key group further comprises:
selecting, by the third controller, one of the plurality of third touch keys as a third selected touch key;
selecting, by the fourth controller, one of the plurality of fourth touch keys as a fourth selected touch key; and
grouping the third selected touch key and the fourth selected touch key into a second touch key group.

16. The operation method according to claim 11, wherein the first touch sensing signal groups from the plurality of selected touch keys of the first touch key group have a plurality of touch intensities, wherein the plurality of touch intensities correspond to the plurality of selected touch keys of the first touch key group, wherein the step of when the plurality of selected touch keys of the first touch key group among the at least one touch key group are simultaneously touched, sequentially providing the plurality of touch driving signals to the first touch key group comprises:

when the plurality of touch intensities are greater than a threshold value, sequentially providing the plurality of touch driving signals to the first touch key group.

17. The operation method according to claim 16, further comprising:

when at least one of the plurality of touch intensities is less than or equal to the threshold value, stopping providing the plurality of touch driving signals to the first touch key group.

18. The operation method according to claim 11, wherein the plurality of touch driving signals comprise a first touch driving signal having a first frequency and a second touch driving signal having a second frequency, wherein the plurality of second touch sensing signal groups comprise a plurality of first touch intensities and a plurality of second touch intensities generated by the plurality of selected touch keys of the first touch key group in response to the first touch driving signal and the second touch driving signal, respectively, and wherein the step of when the plurality of second touch sensing signal groups all indicate that the plurality of selected touch keys of the first touch key group are simultaneously touched, determining that the touch on the first touch key group is a valid touch comprises:

when the plurality of first touch intensities and the plurality of second touch intensities are both greater than a threshold value, determining that the touch on the first touch key group is a valid touch.

19. The operation method according to claim 18, further comprising:

when the plurality of first touch intensities and at least one touch intensity among the plurality of second touch intensities are less than or equal to the threshold value, determining, by the processing circuit, that the touch on the first touch key group is an invalid touch.

20. The operation method according to claim 18, further comprising:

when all of the plurality of first touch intensities are greater than the threshold value and at least one touch intensity among the plurality of second touch intensities is less than or equal to the threshold value, determining, by the processing circuit, that the touch on the first touch key group is an invalid touch and the first touch key group is interfered by noise having a first frequency.

\* \* \* \* \*